US012417274B2

(12) United States Patent
Pottier et al.

(10) Patent No.: US 12,417,274 B2
(45) Date of Patent: Sep. 16, 2025

(54) BRAIN-COMPUTER INTERFACE DEVICE, SYSTEM AND OPERATING METHOD

(71) Applicant: Arm Limited, Cambridge (GB)

(72) Inventors: Remy Pottier, Grenoble (FR); Hugo John Martin Vincent, Cambridge (GB); Mbou Eyole, Soham (GB); Michael James Kanellos, San Francisco, CA (US)

(73) Assignee: Arm Limited, Cambridge (GB)

( * ) Notice: Subject to any disclaimer, the term of this patent is extended or adjusted under 35 U.S.C. 154(b) by 237 days.

(21) Appl. No.: 18/063,597

(22) Filed: Dec. 8, 2022

(65) Prior Publication Data

US 2024/0193251 A1 Jun. 13, 2024

(51) Int. Cl.
*G06F 21/44* (2013.01)
*G06F 3/01* (2006.01)

(52) U.S. Cl.
CPC .......... *G06F 21/44* (2013.01); *G06F 3/015* (2013.01)

(58) Field of Classification Search
CPC .......... G06F 21/44; G06F 21/31; G06F 21/32; G06F 3/012; G06F 3/0442; G06F 3/0455; G06F 2221/2103; G06N 3/0442; G06N 3/091
See application file for complete search history.

(56) References Cited

U.S. PATENT DOCUMENTS

| | | | | |
|---|---|---|---|---|
| 2020/0272722 | A1* | 8/2020 | Furman | G06F 21/34 |
| 2022/0004846 | A1* | 1/2022 | Fukuda | G06V 10/82 |
| 2023/0093444 | A1* | 3/2023 | Zander | G06F 3/013 |
| | | | | 706/12 |
| 2024/0126844 | A1* | 4/2024 | Soryal | G06F 21/6209 |

OTHER PUBLICATIONS

Notification of Transmittal of the International Search Report and the Written Opinion of the International Searching Authority, or the Declaration, App. No. PCT/GB2023/053040, Mailed Feb. 2, 2024, 13 pages.
Notification Concerning Transmittal of Copy of International Preliminary Report on Patentability, App. No. PCT/GB2023/053040, Mailed Jun. 19, 2025, 8 pages.

* cited by examiner

*Primary Examiner* — Khoi V Le
(74) *Attorney, Agent, or Firm* — Berkeley Law & Technology Group, LLP

(57) ABSTRACT

A method and apparatus to control operation of a brain-computer interface, comprising: capturing, at a sensor, a time series of brain activity in response to stimuli; passing data for the time series of brain activity to a history-based challenge generator; receiving, from the history-based challenge generator, a challenge comprising a generated stimulus with a predicted brain response derived from data for the time series of brain activity; issuing the challenge over the brain-computer interface; capturing, at the sensor, a brain response to the challenge; comparing, by an authenticator, the brain response to the challenge with the predicted brain response for the generated stimulus; and responsive to finding no match between the brain response to the challenge and the predicted brain response, preventing further activity over the brain-computer interface.

17 Claims, 2 Drawing Sheets

BRAIN-COMPUTER INTERFACE DEVICE, SYSTEM AND OPERATING METHOD

BACKGROUND

The present techniques relate to brain computer interface entities (devices and/or programs) and methods of operating brain computer interface entities. The methods and apparatus herein described may be useful for ensuring confidentiality, integrity, reliable availability and safety for users of brain computer interface devices.

Brain computer interface (BCI) entities operate on the principle that the human brain exhibits usable characteristics in terms of electrical activity and states that can be both detected and operated upon using, for example, electrode-equipped sensors and signalers to pass data from, and sometimes to, the brain. The simplest form of BCI is that used by the well-known electroencephalogram (or electroencephalograph) system that detects brain wave electrical activity and typically provides a graphical representation of the numeric values of electrical impulses detected in various areas of the brain. This technology has existed for some considerable time and has been extensively researched. More recently, devices have been developed that enable the brain's electrical states and activities to be detected and used under the control of the subject to emit signals from the brain to control devices. Similarly, there are now devices, used for various medical purposes, that can employ a brain computer interface to control aspects of brain functioning by directly injecting or modifying signals, to, for example, feed sensory information directly to the brain (e.g., cochlear implant technology to compensate for hearing impairment) or to mask or modify brain signals to control involuntary movement disorders.

One example of a detectable signal is the P300 wave, the event-related potential, which typically appears in an encephalogram when the brain is presented with the stimulus of an infrequently encountered task. As will be clear to one of ordinary skill in the art, many other patterns of state and activity may also be detected using the various sensor means, which may be invasive (direct surgical implants, for example) or non-invasive, such as an electrode-equipped cap to be worn by the subject, or an electronic tattoo. Recent developments in this field also include slightly invasive techniques, such as the "neural lace" network of imbedded electrodes, which is intended to minimize the surgical impact of imbedded devices, by using a kind of miniature "keyhole" to insert a portion of electronic fabric that is then unfurled sub-dermally.

Many researchers and companies in the technology industry are now considering the non-medical uses of brain-computer interfaces, as it becomes clear that new advances in artificial intelligence, virtual and augmented reality and the metaverse will require advances in interface technology to match the advances in computational power that are becoming available. The gating factor or bottleneck in many everyday computer-assisted activities is already the human-computer interface, and this problem will become exacerbated as more demands are placed on computing systems—the provision of a faster, more direct means of interfacing with computing entities will become increasingly important over time. The present technology addresses at least some of the shortcomings of the present state of the art.

For various reasons, over the years, the development of human-computer interaction has seen a steady progression from the very earliest days of mathematical formula programming using plugboards, through punch cards and paper tape, through teletype to text keyboard and screen, and onward to graphical user interfaces using the mouse and desktop, and further on to natural language voice and gestural control with haptic feedback. In all cases, there has been a progression from learning complexity to learning simplicity. Similarly, the successors to the earliest POSSUM interfaces for persons having limited motor ability have provided access to communications and independence of control to innumerable people otherwise significantly affected by physical restrictions. It is now seen as desirable, not least for reasons of greater universality of access to the benefits of technology, to provide input and output mechanisms that involve direct contact with nerve and brain signals. In medicine and prosthetics, for example, direct control of devices by nerve impulse has seen great advances. Outside the realm of medical devices and prosthetics, the developments leading to the widespread use of augmented and virtual reality and the metaverse increase the demand for a simpler, more user-friendly way to interact with computing entities, and this increases the desirability of providing safe and secure means of interfacing with computing entities using the brain itself.

In this new environment, the brain-computer interface can translate human brainwaves into machine-understandable commands, allowing people to operate a computer, for example, with their mind. In the near future, brain and nerve connectivity will be used in many more healthcare applications and will expand into consumer-oriented ones (e.g., human sensing in the metaverse). The questions arise: how can the interface be designed to prevent brain hacking at the interface level—how can a rogue application be prevented from "writing" to the brain for malicious effects? In the reverse direction, how can the interface design prevent the use of the brain-computer interface for hijacking a user's identity where the patterns of brain activity have become a form of biometric authentication "password"?

As has been noted by many researchers in the field, many questions of safety and security are raised by the operation of such direct brain computer interfaces, and it is clear to anyone of skill in the art that for brain-computer interfaces to become widely accepted, they must be shown to have safeguards in place to prevent dangerous or otherwise undesirable consequences. These safeguards may be required for the normal purposes of protecting personal data and the like, but may also, and more importantly, be required to prevent malicious interference with the user's brain itself.

The following are some of the requirements for the interfaces of the future, as they were for those interfaces already existing:

Integrity: Information must be protected against unauthorized modification or destruction, and can be warranted to be unaltered from source through transmission, storage, and eventual receipt by the destination.

Confidentiality: There must be restrictions on access and disclosure of information, including means for protecting personal privacy and proprietary information.

Availability: The information must be kept accessible and usable for its intended purposes by authorized persons.

Safety: The system must be free of conditions that can cause any form of harm to users from the physiological, psychiatric, and psychological perspectives.

BRIEF DESCRIPTION OF THE DRAWINGS

The present technology is diagrammatically illustrated, by way of example, in the accompanying drawings, in which.

DETAILED DESCRIPTION

Figure 1:
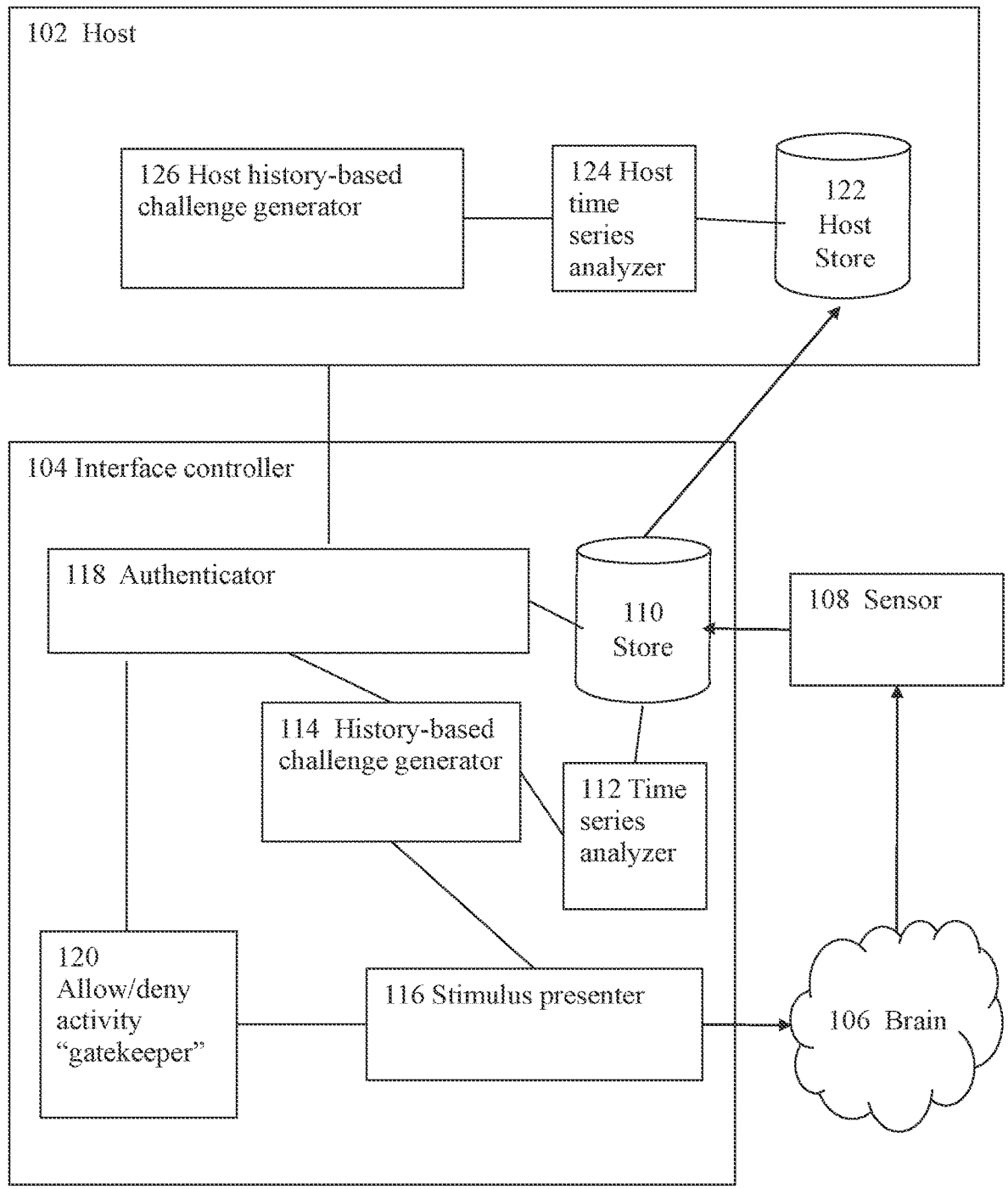
FIG. 1 shows a much-simplified schematic representation of a system of apparatus according to an implementation of the present technology.

According to a first technique there is provided a method of controlling operation of a brain-computer interface, comprising: capturing, at a sensor, a time series of brain activity in response to stimuli; passing data for the time series of brain activity to a history-based challenge generator; receiving, from the history-based challenge generator, a challenge comprising a generated stimulus with a predicted brain response derived from data for the time series of brain activity; issuing the challenge over the brain-computer interface; capturing, at the sensor, a brain response to the challenge; comparing, by an authenticator, the brain response to the challenge with the predicted brain response for the generated stimulus; and responsive to finding no match between the brain response to the challenge and the predicted brain response, preventing further communication over the brain-computer interface.

According to a second technique there is provided apparatus comprising: a memory; an electronic communication link; and a processor configured in conjunction with the memory to control operation of a brain-computer interface by: capturing, at a sensor, a time series of brain activity in response to stimuli; passing data for the time series of brain activity to a history-based challenge generator; receiving, from the history-based challenge generator, a challenge comprising a generated stimulus with a predicted brain response derived from data for the time series of brain activity; issuing the challenge over the brain-computer interface; capturing, at the sensor, a brain response to the challenge; comparing, by an authenticator, the brain response to the challenge with the predicted brain response for the generated stimulus; responsive to finding no match between the brain response to the challenge and the predicted brain response, preventing further communication over the brain-computer interface.

According to a third technique, there is provided a computer program product stored on a non-transitory computer-readable medium and operable to carry out the steps of the method described hereinabove.

Broadly speaking, embodiments of the present techniques provide for improved control over the operation of a brain-computer interface device, to render computationally infeasible the use of false signals to intervene in brain-computer communications by providing a firewall effect between the brain and any outside entity.

Where the word "sensor" and its derivatives are used herein, they are intended to encompass at the least the following meanings: any apparatus or system capable of detecting any form of information indicative of brain state or activity, for example, electroencephalography, functional magnetic resonance imaging, functional near-infrared spectroscopy, magnetoencephalography, magnetic resonance tomography, and the like. Sensors according to implementations of the present technology may be invasive (direct surgical implants, for example), fully non-invasive, (such as an electrode-equipped cap to be worn by the subject), or slightly invasive (such as electronic tattoos or the "neural lace" network of subdermal imbedded electrodes). Further developments in interface technology can be expected in the near future and the presently disclosed technology envisages all and any of these developments in possible future embodiments, which do not affect the applicability of the present technology as defined by the appended claims. For example, there may be future developments in forms of remote sensing of brain states and activities, and the present technology is envisaged to operate with equal usefulness with such new developments.

In an implementation of the present technology, there is provided a time-sensitive authentication system for a brain-computer interface, whereby the temporal state and activity of the brain are monitored over time to provide the inputs to generate a stimulus and predicted response pair that can be used to challenge an attempt to pass a command signal from or to a brain by way of the interface. The present technology may be implemented as unidirectional or bidirectional, depending upon whether the technology is required only to protect the brain from outside activity, only to provide protection for an external entity from actions performed by the brain, or both. The present technology is useful in the prevention of a rogue entity from intervening either in a transmission to a brain in order to send a malicious signal inbound to the brain, or in a transmission from a brain, where a rogue entity passes a message falsely purporting to originate from the brain, or where the brain is stimulated to issue a spurious command to the external entity.

In one implementation, the present technology provides a long-short-term memory (LSTM) neural network that accepts as input from one or more sensors time-series data that tracks brain state and its evolution over time. The LSTM holds an extensive set of time series data and operates upon the data to generate a proposed stimulus and to provide for that stimulus a predicted response in the form of a pattern of detectable brain states and activities, which pattern can be matched with an actual response to the proposed stimulus.

Given the high dimensionality of brain signals (especially if the system is collecting a large number of signals all the time using electrodes, for example, in an electronic tattoo), it is desirable to use an autoencoder on the client side in addition to or alongside some other form of compression to reduce the size of the data that is to be passed. An autoencoder has the advantages of rendering unstructured data easier to interpret by clearly separating data clusters and also reducing the effects of noise. The output of this autoencoder is then sent at some preset periodicity and used to train the long-short-term memory neural network. The data from the long-short-term memory neural network is then exploited to generate a challenge in the form of a proposed stimulus and its predicted response. In an "inbound" implementation, where a signal is sent to the brain to cause some action, the header of the signal may comprise a low-current "challenge" (wherein the electrical current levels and modulation are deemed to be safe a priori) which the brain responds to—if the brain's response matches what the long-short-term memory neural network predicted then the rest of the signal is accepted. In this implementation, there may be provided a "standalone" chip at the stimulus electrode that performs the check and puts the entire brain-computer interface into a "safe mode" if the check fails; otherwise, on a successful match, it allows the host to continue to "write" to the client's brain. In one variant, the challenge stimulus may be presented, not in the form of a direct signal to the brain, but in the form of an external stimulus perceived using natural human senses, such as an auditory or visual signal.

In an implementation tailored to handle "outbound" signals from the brain to cause effects in external systems (for example, to control physical devices), the stimulus/predicted response challenge may be used as a form of biometric password. It has been noted by various researchers that several of the known biometric measures used as access controls have the disadvantage that they offer no proof that the person to whom the biometric measure pertains is actually alive and present at the time—a dead or severed finger has the same fingerprint as a live, still attached, finger. It has proved possible to trick iris scanners with "forged" iris representations created by reverse engineering to derive critical characteristic features of an iris and reproduce them precisely. Even some forms of brain response used as a biometric access control could potentially be recorded and replayed by a malicious actor. Using the present technology, where brain responses to stimuli are monitored over time, so that a new response is predicted for a stimulus based on the progression of the brain's changing reactions to a stimulus over time, it is possible to advantageously use the brain response biometric as also a proof of life, so that replay attacks are made computationally infeasible in the context of a brain response biometric access control system. The stimulus/predicted response challenge may be provided with an attached timestamp, so that the system can assess its position on an extrapolation of the original time series from which it was derived and thereby match the temporally correct pattern in its assessment of the actual against the predicted brain response.

In its various implementations, the device can improve the levels of confidentiality, integrity, availability and safety provided to users of brain computer interface devices.

Referring to FIG. 1, there is shown a system 100 of apparatus according to an implementation of the present technology.

The system 100 comprises a host 102, an interface controller 104 and a sensor 108, wherein sensor 108 and interface controller 104 are in electronic communication with a brain 106. The term "host" is to be understood as representing an entity that is separate from the interface controller 104 and sensor 108, but which may be implemented either as a remote host operable to communicate over a network link, or as a closely coupled subsystem within a single larger system that may incorporate interface controller 104 and sensor 108. Host 102 may be operable to perform processing on behalf of external applications when the user (the owner of brain 106) is authenticated, or may be the location of applications that are to pass signals inbound to brain 106. As described above, sensor 108 may comprise one or more devices that may be worn by a user, or may be implemented in the form of an implanted device. With advances in technology, it may be possible at some future date to implement the present technology using some form as yet unknown of remote sensing of brain states and activity, and the present technology is envisaged to encompass all and any such technologies as they develop.

Interface controller 104 is provided with a store 110 for storing data, such as inputs from sensor 108. Store 110 may comprise any of the known or yet to be developed forms of data storage, such as disk, tape and solid-state storage, or any other form of storage, since the function of the store 110 is suitable to be performed using any form of data storage medium. Store 110 is, in the present technology, adapted to provide storage for time series data accumulated from sensor 108. Store 110 is arranged in electronic communication with time series analyzer 112, which may comprise any form of analysis hardware, software or hybrid arrangement.

Time series analyzer 112 may comprise, for example, a neural network trained on training data (gathered, for example, from a brain 106 by a sensor 108) to analyze time series of brain states and activity in association with data characterizing the relevant stimuli that caused the brain states and activity. The neural network may comprise a long short-term memory neural network in order to retain and learn from sufficient time series data to be able to predict a response to a future stimulus with a usable degree of accuracy. Time series analyzer 112 is operable in cooperation with history-based challenge generator 114 to produce a challenge based on computations over the time series data, the challenge comprising a proposed stimulus that is predicted to produce a particular response that can be sensed by sensor 108. The proposed stimulus and response pair may be "positioned" on a time line extrapolated from the line of the time series data, such that a challenge with a specific timestamp can only represent the stimulus and response pair for that specific point on the extrapolated time line. A challenge with a timestamp that is too old with reference to a threshold established relative to a real-time clock may be disregarded as no longer valid. In this way, the challenge may be used to determine the liveness of the user—the extrapolated stimulus-response pair generated from the timeline would be computationally difficult, if not infeasible, to replicate in such a way as to deceive the system with a "replay" of a non-present user's brain activity patterns.

History-based challenge generator 114 is arranged in communication with stimulus presenter 116, which is operable to present a stimulus from the challenge to the brain 106. History-based challenge generator is further in communication with authenticator 118, to provide authenticator with the generated stimulus-response pair ready for comparison with an actual current response from brain 106, so as to authenticate the user on an outbound signal. Authenticator 118 is in turn in communication with allow/deny "gatekeeper" 120, which operates for the safety of the user in cases of failed authentication in either direction, by preventing at least one action at the brain-computer interface, and which may comprise placing the interface in a safe mode. Safe mode, in this respect, may involve the prevention of actions that may cause any input signal to the brain, or it may involve preventing all but low-impact (low current or low modulation) signals, or it may involve preventing the brain from controlling one or more external devices. As will be clear to one of ordinary skill in the art, the safe mode will typically be cancelled when the cause of the original problem has been removed or otherwise dealt with.

In the example implementation shown in FIG. 1, host 102 is arranged in electronic communication with interface controller 104. Host 102 may act as an outward-facing interface to the external world, for example, by receiving inbound signals from external sources, such as applications, and presenting them to interface controller 104. This arrangement provides a "separation of powers" that enables host 102 to be connected, for example, to the Internet without the brain-computer interface itself being exposed to the external electronic environment. Host 102 is operable to receive into its host store 122 (over some form of electronic communication medium or channel) time series data from store 110 in interface controller 104. Host 102 is provided with its own host time series analyzer 124 operable to analyze the received time series data. Host time series analyzer 124 may comprise, for example, a neural network trained on training data (gathered, for example, from a brain 106 by a sensor 108 and passed to host 102 by interface controller 104 on a periodic basis) to analyze time series of brain states and activity in association with data characterizing the relevant stimuli that caused the brain states and activity. The neural network may comprise a long short-term memory neural network in order to retain and learn from sufficient time series data to be able to predict a response to a future stimulus with a usable degree of accuracy. A long short-term memory neural network is a form of recurrent neural network that is suitable for processing sequences of data points to make predictions based on time series data, as in the present technology.

Host time series analyzer 124 is operable in cooperation with host history-based challenge generator 126 to produce a challenge based on computations over the time series data, the challenge comprising a proposed stimulus that is predicted to produce a particular response that can be sensed by sensor 108. The proposed stimulus and response pair may be "positioned" on a time line extrapolated from the line of the time series data, such that a challenge with a specific timestamp can only represent the stimulus and response pair for that specific point on the extrapolated time line. A challenge with a timestamp that is too old with reference to a threshold established relative to a real-time clock may be disregarded as no longer valid.

Host history-based challenge generator 114 is arranged in communication with interface controller 104, which can pass the host-generated challenge to stimulus presenter 116, which is operable to present a stimulus from the challenge to the brain 106. Host history-based challenge generator further provides authenticator 118 at interface controller 104 with the generated stimulus-response pair ready for comparison with an actual current response from brain 106, so as to authenticate the host on an inbound signal. Authenticator 118 is in turn in communication with allow/deny "gatekeeper" 120, which operates for the safety of the user in cases of failed authentication on the inbound signal, by preventing at least one action at the brain-computer interface, and which may comprise placing the interface in a safe mode. Safe mode, in this respect, may involve the prevention of actions that may cause any input signal to the brain 106, or it may involve preventing all but low-impact (low current or low modulation) input signals that cannot threaten the safety of the user. As will be clear to one of ordinary skill in the art, the safe mode will typically be cancelled when the cause of the original problem has been removed or otherwise dealt with.

In various implementations, additional or alternative measures may be taken as well as the prevention of a particular action at the interface. For example, all communications between the host system and the interface may be terminated and require a complete reboot to clear any residual effects of the terminated session in which the authentication failed. In another example, a host system may be instructed to destroy information derived from one or more precious interactions over the interface. In a further example, the host system may be de-authenticated or locked out from any further access to the interface. In an implementation, an alternative form of authentication may be required before any further communication is permitted to pass over the interface.

It will be clear to one of skill in the art that the implementation shown in FIG. 1 and described above provides a new and useful structure of components (hardware, software, or hybrid) that offers a mutual security and safety infrastructure for communications between a host and its applications and a user's brain, mediated by a brain-computer interface controller according to implementations of the present technology.

Figure 2:
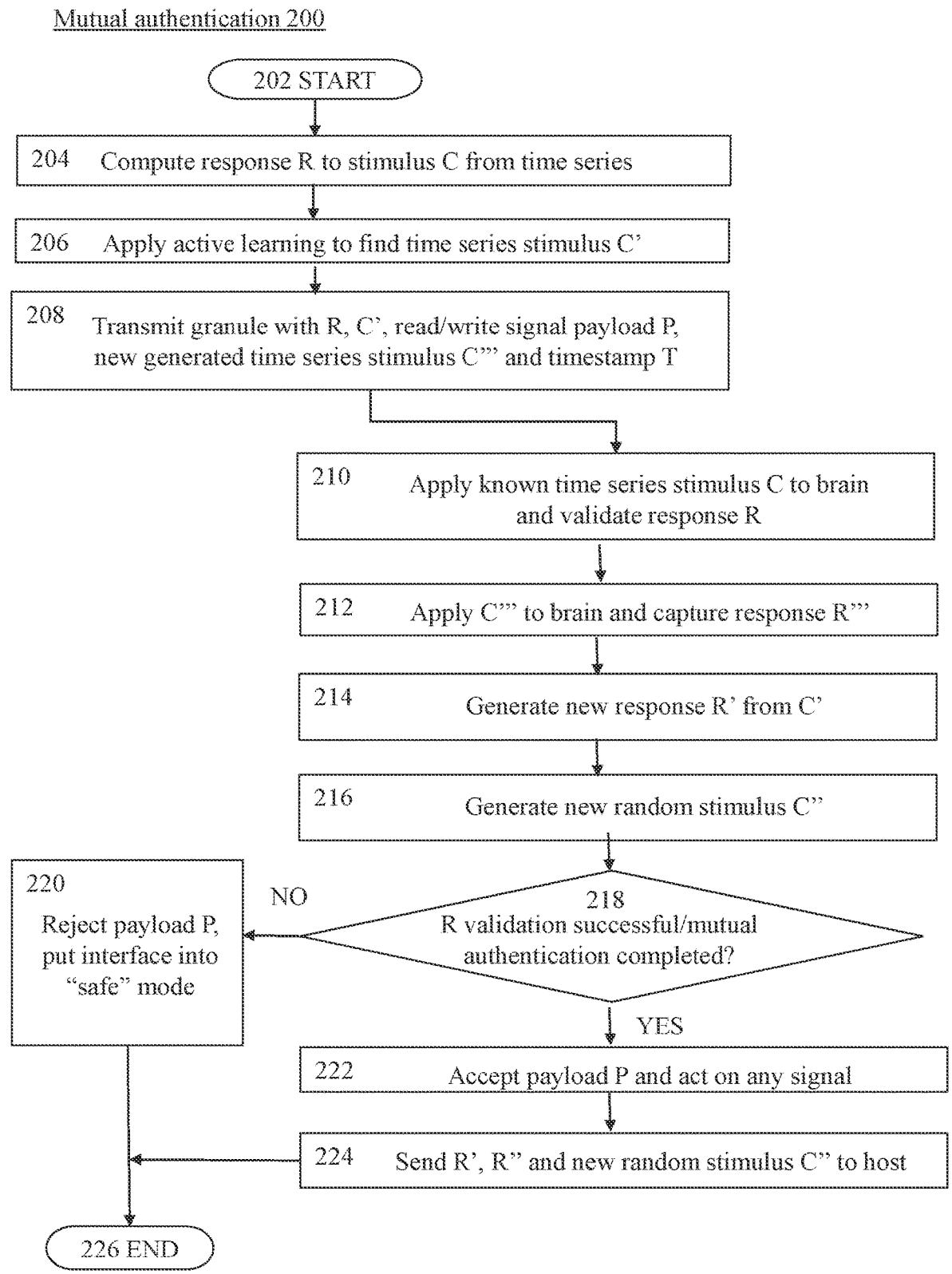
FIG. 2 shows a flow chart illustrating steps of a simplified method according to an implementation of the present technology.

Turning now to FIG. 2, there is shown a flow chart illustrating steps of a simplified method of providing mutual authentication 200 according to an implementation of the present technology.

The process begins at START 202, and at 204, the host (typically as defined hereinabove at 102 in FIG. 1 and its accompanying description) computes a response R to a stimulus C from at least one previous interaction in a time series of brain signal data. The computation may be performed, for example, using a long short-term memory neural network, which provides for the holding of a sufficient depth of history for a useful analysis of the trends over time, to allow for the well-known and understood "aging" of responses to stimuli over iterations of exposure to the stimuli.

The data will typically have been subjected to autoencoding, to improve cluster delineation and to reduce the noise-to-signal ratio—brain electrical state and activity data is typically noisy and benefits from this characteristic of autoencoding. The data may also have been compressed for transmission, and will thus require decompression before it can be processed. At 206, an active learning technique (using, for example, iterative refinement of queries) is applied to the time series data to find a stimulus C'. C' is selected on the basis that it is distant (in terms of the multi-dimensional clustering of the data) from the center of one or more clusters representing previous stimuli in the time series.

The host assembles a transmission granule (a signal to be passed to the brain-computer interface) comprising computed response R (relating to stimulus C), stimulus C' as selected at 206, a read/write signal payload P, a new randomly-generated stimulus C''', and a timestamp T. The granule is then transmitted to the brain-computer interface at 208. Payload P may comprise signals to request the brain to emit a response, such as a command to an actuator connected to host 102, or it may comprise a signal to cause a modification of a brain activity pattern, such as a signal to restrict an involuntary movement as described above.

At 210, the brain-computer interface applies the known (previous) time-series stimulus C to the brain and validates the incoming response R—this action, in essence, calibrates the stimulus-response process, ready for further actions. The interface controller causes generated time-series stimulus C''' to be applied to the brain and the response R' to be captured. The interface then generates at 214 a new response R' from stimulus C', and generates at 216 a new random stimulus C''—these data items are suitably formatted for later sending to the host to feed into the long short-term memory neural network as part of the updates to the time series data.

At 218, a test is applied to determine whether R validation has been successful, and thus mutual authentication has completed. This may further entail checking that timestamp T falls within the aging limits and is still valid, as a tool to mitigate the risk of replay attacks using old captured data.

If the test at 218 returns NO—that is, the validation has not been successful, or the timestamp falls outside the aging limits for this system, at 220, the payload P is rejected (so that no potentially "contaminating" commands or signals may be passed to the brain) and the brain-computer interface may be placed in a safe mode until any problem has been adequately resolved—as will be clear to one of skill in the art, a failed authentication or validation at this stage may be a simple glitch in the signals being passed, or it may be a single deliberately or inadvertently "contaminated" signal, but it may also be indicative of a wider failure or malicious act, and thus require resolution to protect the host system, the brain-computer interface itself and the user. Once the actions at 220 have completed, the process ends at 226. As will be clear to one of skill in the art, END 226 merely represents the end of this iteration of the process, and the process or parts of the process may operate in an iterative manner in the various implementations.

If the test at 218 returns YES—that is, the validation has been successful, and the timestamp falls within the aging limits, at 222, the payload P is accepted and the signal in payload P is acted upon. At 224, the R', R" and the newly-generated random stimulus C" that were saved earlier are sent to the host to feed into the long short-term memory neural network as part of the updates to the time series data. The process completes at 226. As will be clear to one of skill in the art, END 226 merely represents the end of this iteration of the process, and the process or parts of the process may operate in an iterative manner in the various implementations.

It will be clear to one of skill in the art that the implementation shown in FIG. 2 and described above provides a new and useful method of operation that offers a mutual security and safety infrastructure for communications between a host and its applications and a user's brain, mediated by a brain-computer interface controller according to implementations of the present technology.

As will be appreciated by one skilled in the art, the present techniques may be embodied as an apparatus, system, method, or computer program product. For example, all or part of the present technology may be embodied in hardware logic incorporated into an implanted or wearable apparatus, or may be embodied in a combination of wearable apparatus and a wired or wirelessly connected device, such as a mobile (cellular) phone. In another instance, the techniques may be embodied in the form of a firmware or software logic arrangement, which may be stored or downloadable on a suitable apparatus.

Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable storage medium. The computer readable storage medium may comprise a non-transitory computer readable storage medium encoded with instructions that, when performed by a processing means, cause performance of the method described above. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object, or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods, or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

What is claimed is:

1. A method of controlling operation of a brain-computer interface, comprising:
   capturing, at a sensor, a time series of brain activity in response to stimuli;
   passing data for the time series of brain activity to a history-based challenge generator;
   receiving, from the history-based challenge generator, a challenge comprising a generated stimulus with a predicted brain response derived from data for the time series of brain activity;
   issuing the challenge over the brain-computer interface;
   capturing, at the sensor, a brain response to the challenge;
   comparing, by an authenticator, the brain response to the challenge with the predicted brain response for the generated stimulus; and
   responsive to finding no match between the brain response to the challenge and the predicted brain response, preventing further communication over the brain-computer interface, wherein preventing further communication over the brain-computer interface comprises placing the brain-computer interface in a safe mode.

2. The method according to claim 1, wherein receiving the challenge comprising the generated stimulus comprises perceiving the generated stimulus by way of natural sense.

3. The method according to claim 1, wherein receiving the challenge comprising the generated stimulus comprises perceiving the generated stimulus by way of a direct brain stimulation.

4. The method according to claim 1, wherein receiving the challenge comprising the generated stimulus with the predicted brain response derived from data for the time series of brain activity comprises receiving a challenge derived by operation of a long-short-term memory neural network on the data.

5. The method according to claim 1, wherein receiving the challenge comprising the generated stimulus with the predicted brain response derived from data for the time series of brain activity comprises receiving a challenge derived from autoencoded data.

6. The method according to claim 1, wherein receiving the challenge comprising the generated stimulus with the predicted brain response derived from data for the time series of brain activity comprises decompressing the challenge from a compression applied by the history-based challenge generator.

7. The method according to claim 1, wherein receiving the challenge comprising the generated stimulus with the predicted brain response derived from data for the time series of brain activity further comprises receiving a timestamp applied by the history-based challenge generator.

8. The method according to claim 7, wherein receiving the timestamp applied by the history-based challenge generator further comprises comparing the timestamp with a real-time clock to determine a liveness characteristic of the challenge.

9. An apparatus comprising:
a memory;
an electronic communication link; and
a processor configured in conjunction with the memory to control operation of a brain-computer interface, control of operation of the brain-computer interface to comprise:
capture, at a sensor, a time series of brain activity in response to stimuli;
pass data for the time series of brain activity to a history-based challenge generator;
receive, from the history-based challenge generator, a challenge comprising a generated stimulus with a predicted brain response derived from data for the time series of brain activity;
issue the challenge over the brain-computer interface;
capture, at the sensor, a brain response to the challenge;
compare, by an authenticator, the brain response to the challenge with the predicted brain response for the generated stimulus; and
responsive to finding no match between the brain response to the challenge and the predicted brain response, prevent further communication over the brain-computer interface by placement of the brain-computer interface in a safe mode.

10. The apparatus according to claim 9, wherein the generated stimulus of the challenge is applied by way of a direct brain stimulation.

11. The apparatus according to claim 9, the history-based challenge generator comprising a long-short-term memory neural network.

12. The apparatus according to claim 9, wherein the history-based challenge generator is co-operable with a clock to supply a timestamp for the challenge.

13. A computer program product comprising computer readable program code stored on a non-transitory computer-readable medium, said computer readable program code being operable, when loaded into a computer and executed thereon, to cause said computer to operate a brain-computer interface, operation of the brain-computer interface to comprise:
capture, at a sensor, a time series of brain activity in response to stimuli;
pass data for the time series of brain activity to a history-based challenge generator;
receive, from the history-based challenge generator, a challenge comprising a generated stimulus with a predicted brain response derived from data for the time series of brain activity;
issue the challenge over the brain-computer interface;
capture, at the sensor, a brain response to the challenge;
compare, by an authenticator, the brain response to the challenge with the predicted brain response for the generated stimulus; and
responsive to finding no match between the brain response to the challenge and the predicted brain response, prevent further communication over the brain-computer interface by placement of the brain-computer interface in a safe mode.

14. The computer program product according to claim 13, wherein receipt of the challenge comprising the generated stimulus comprises perception of the generated stimulus by way of a direct brain stimulation.

15. The computer program product according to claim 13, wherein receipt of the challenge comprising the generated stimulus with the predicted brain response derived from data for the time series of brain activity comprises receipt of a challenge derived by operation of a long- short-term memory neural network on the data.

16. The computer program product according to claim 13, wherein receipt of the challenge comprising the generated stimulus with the predicted brain response derived from data for the time series of brain activity further comprises receipt of a timestamp applied by the history-based challenge generator.

17. The computer program product according to claim 16, wherein receipt of the timestamp applied by the history-based challenge generator further comprises comparison of the timestamp with a real-time clock to determine a liveness characteristic of the challenge.

\* \* \* \* \*